March 31, 1931. J. A. SMETHERS ET AL 1,798,958
AGRICULTURAL IMPLEMENT
Filed Nov. 15, 1926 8 Sheets-Sheet 1
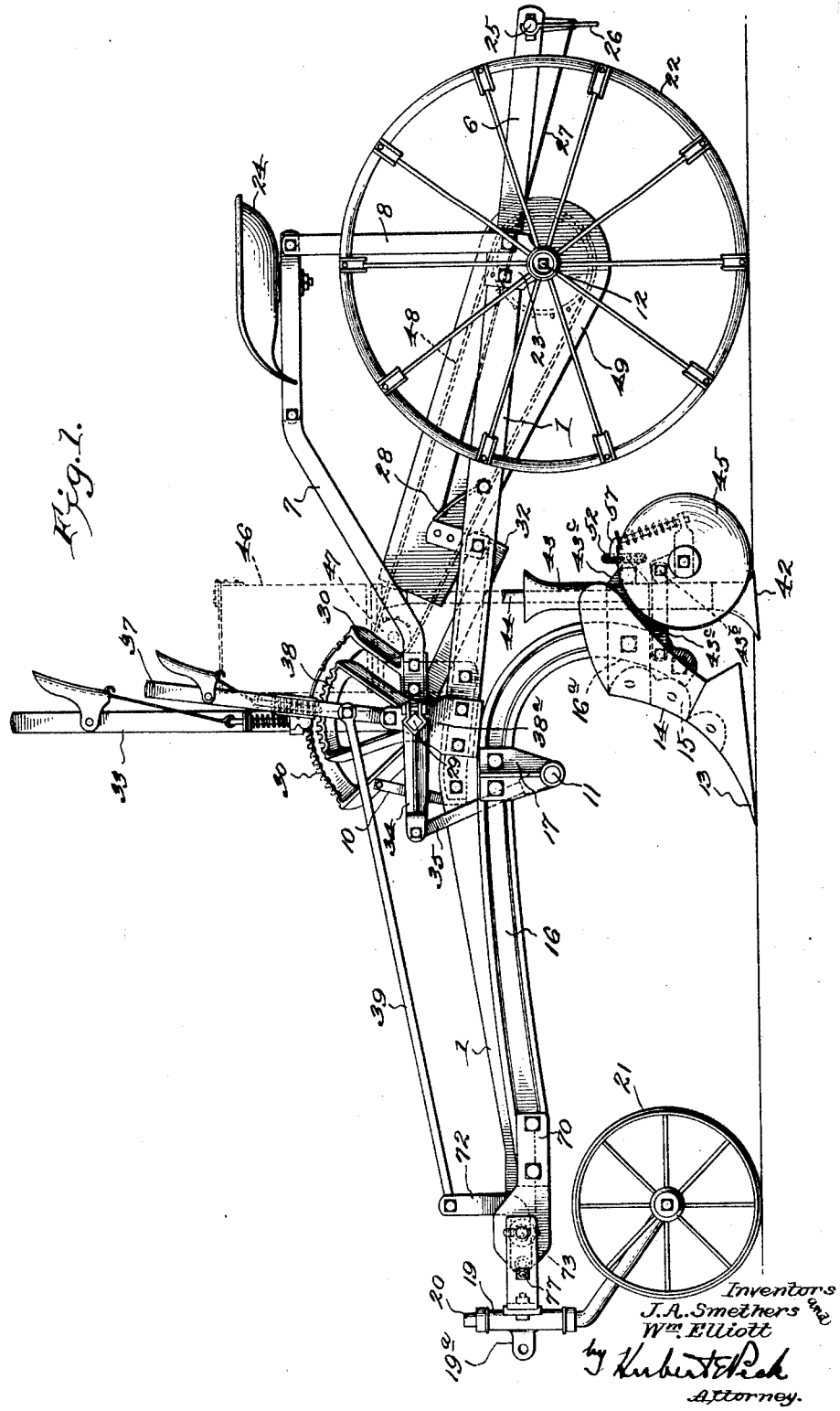

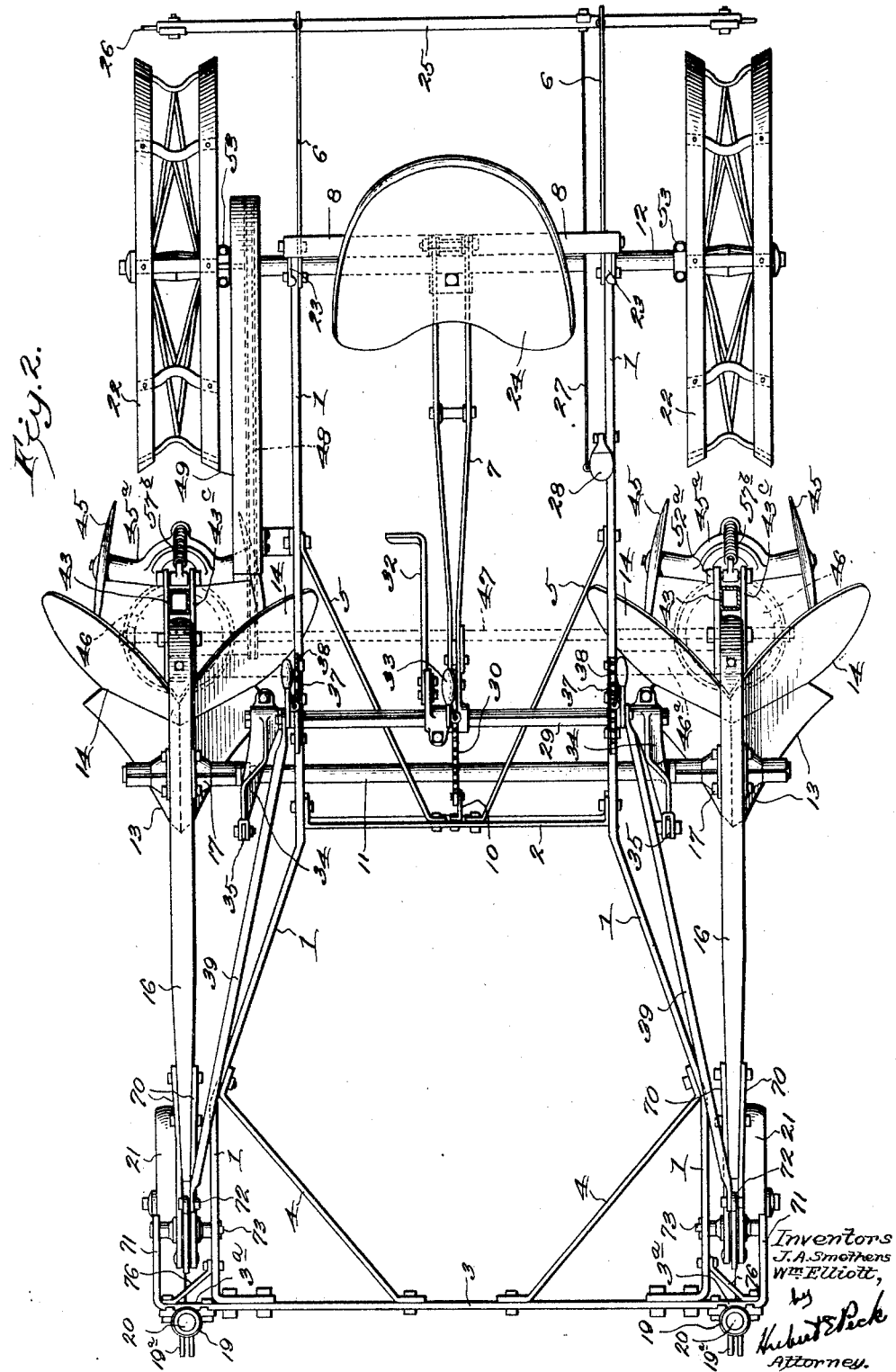

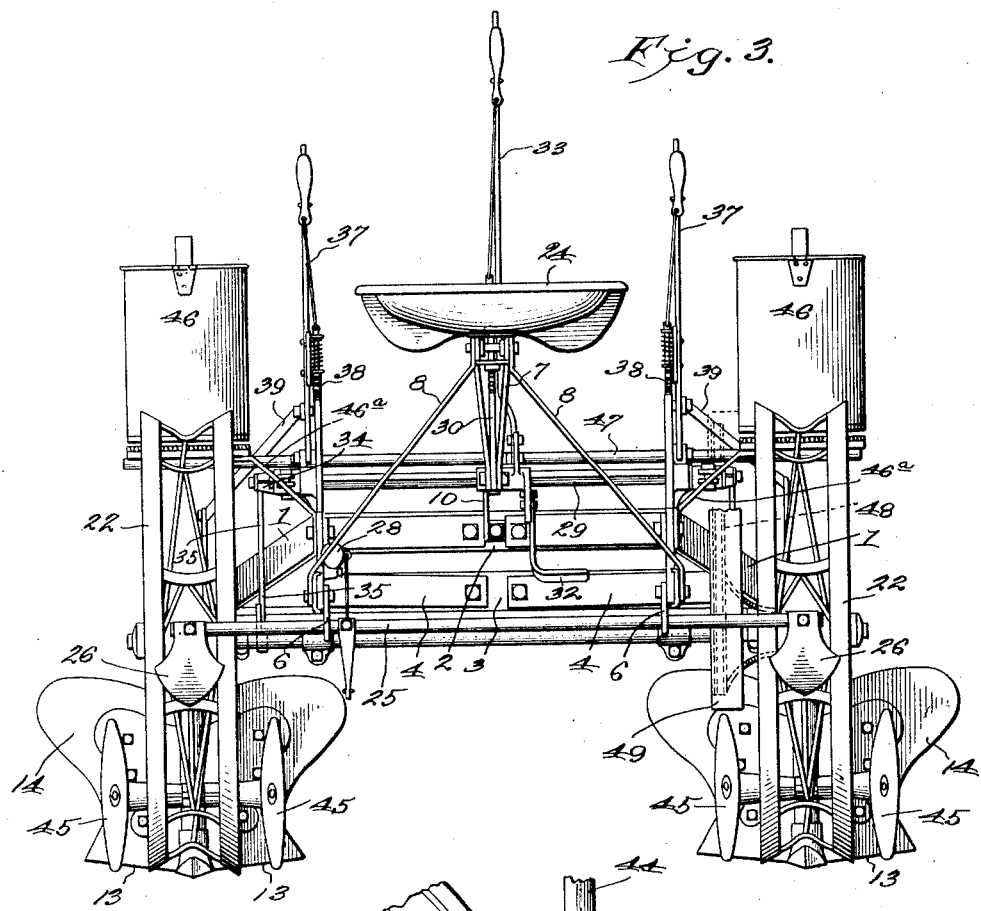

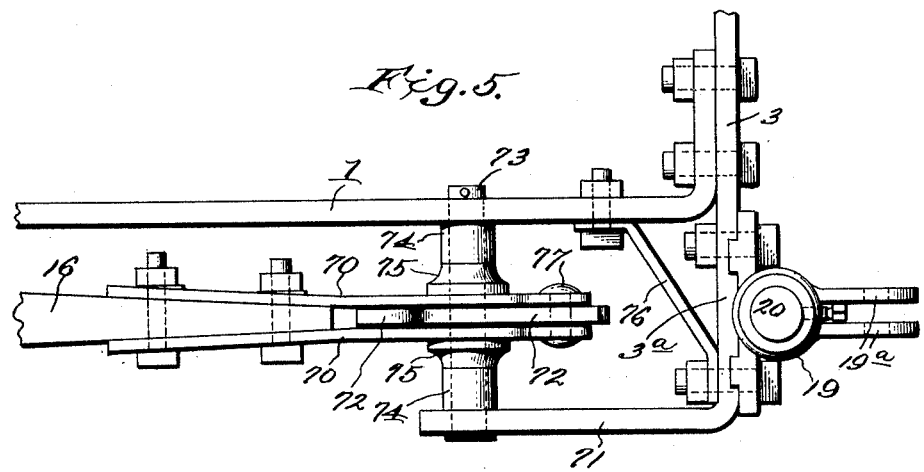
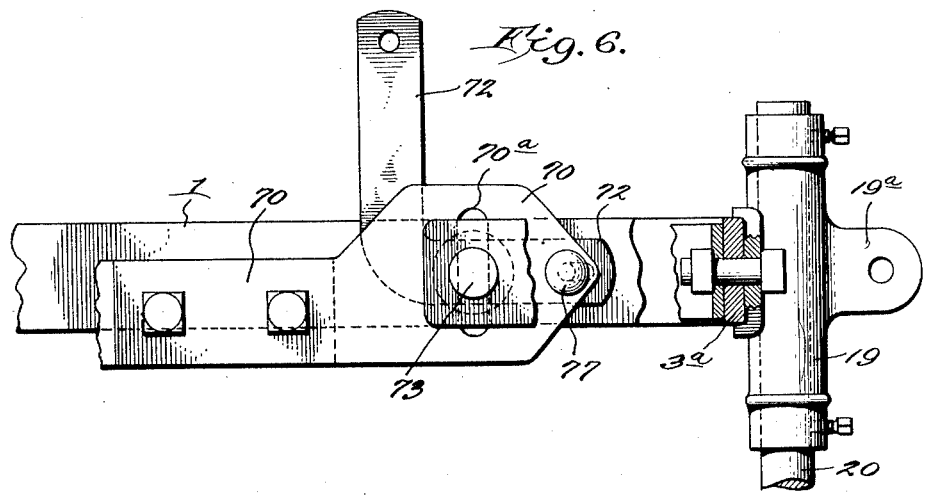
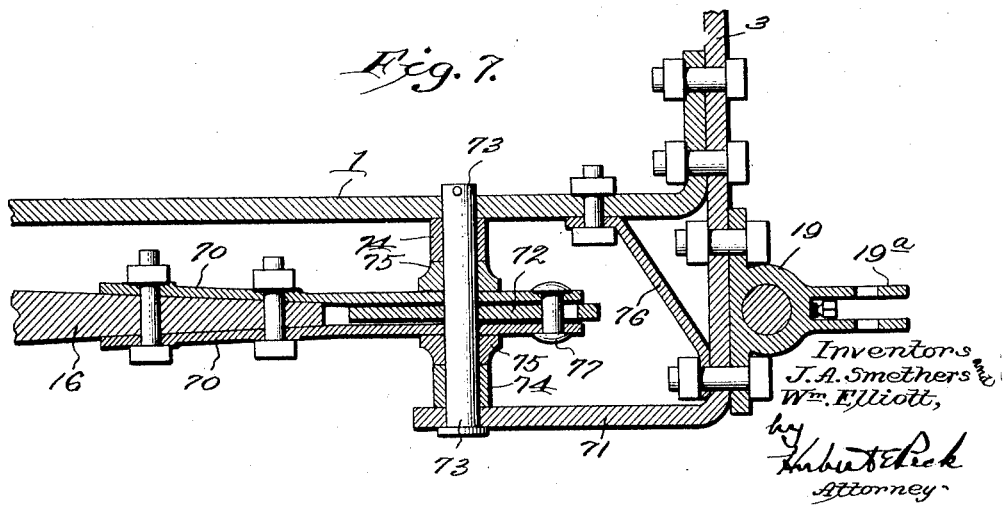

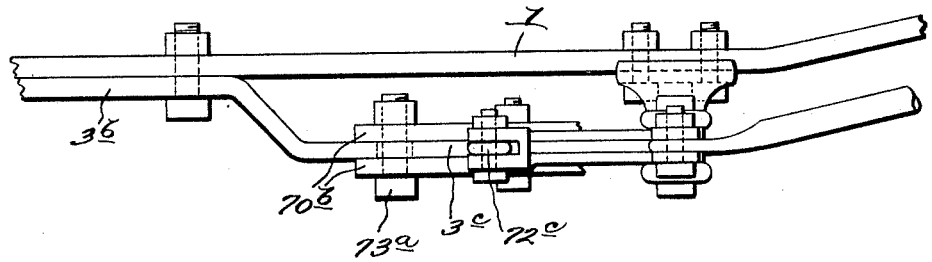
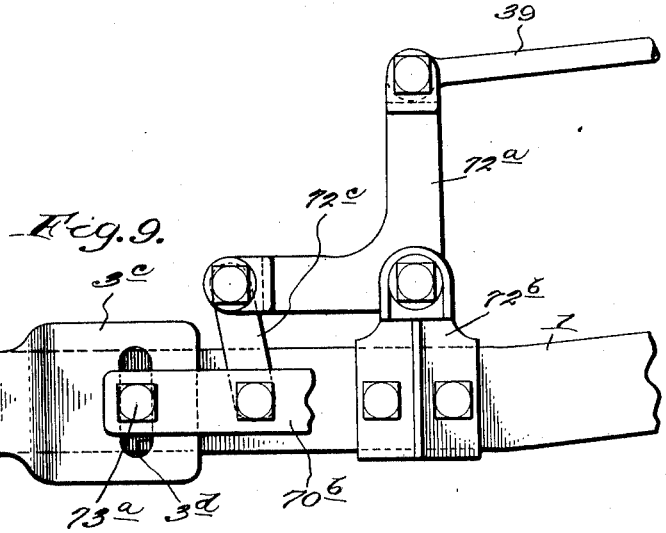
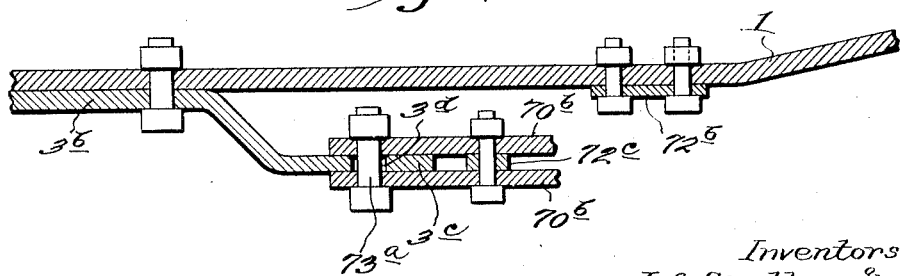

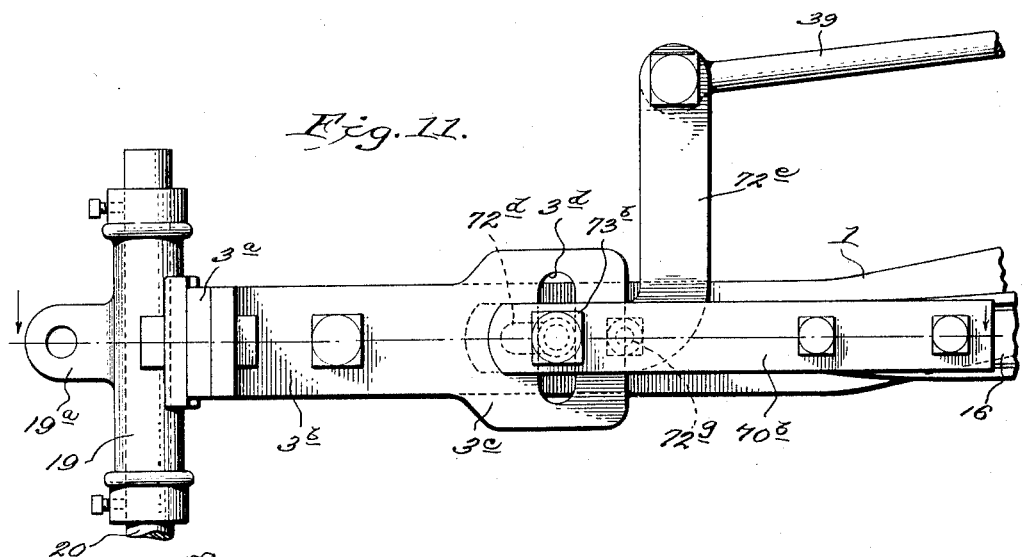
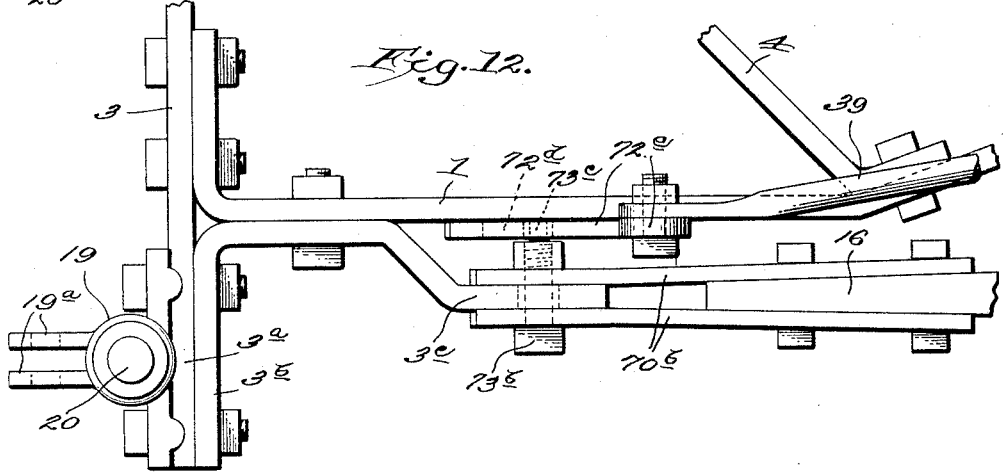
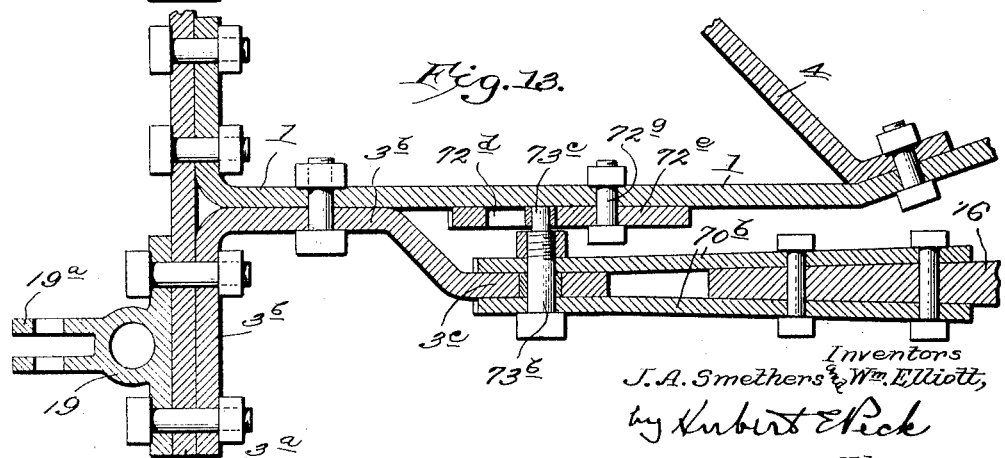

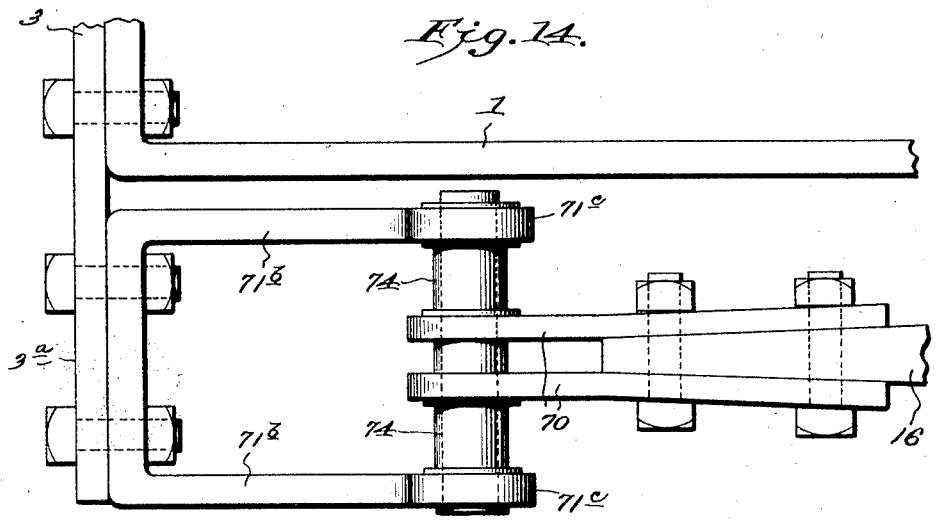
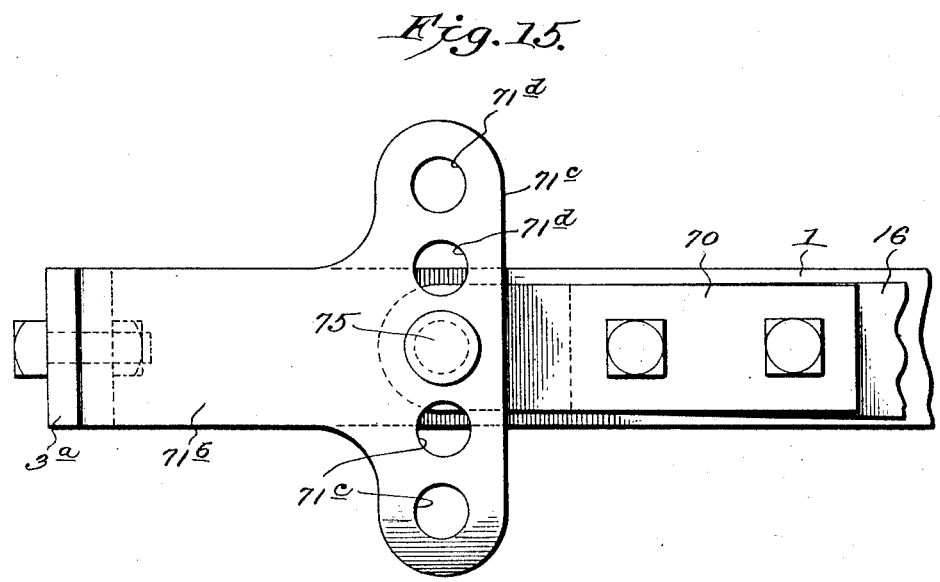

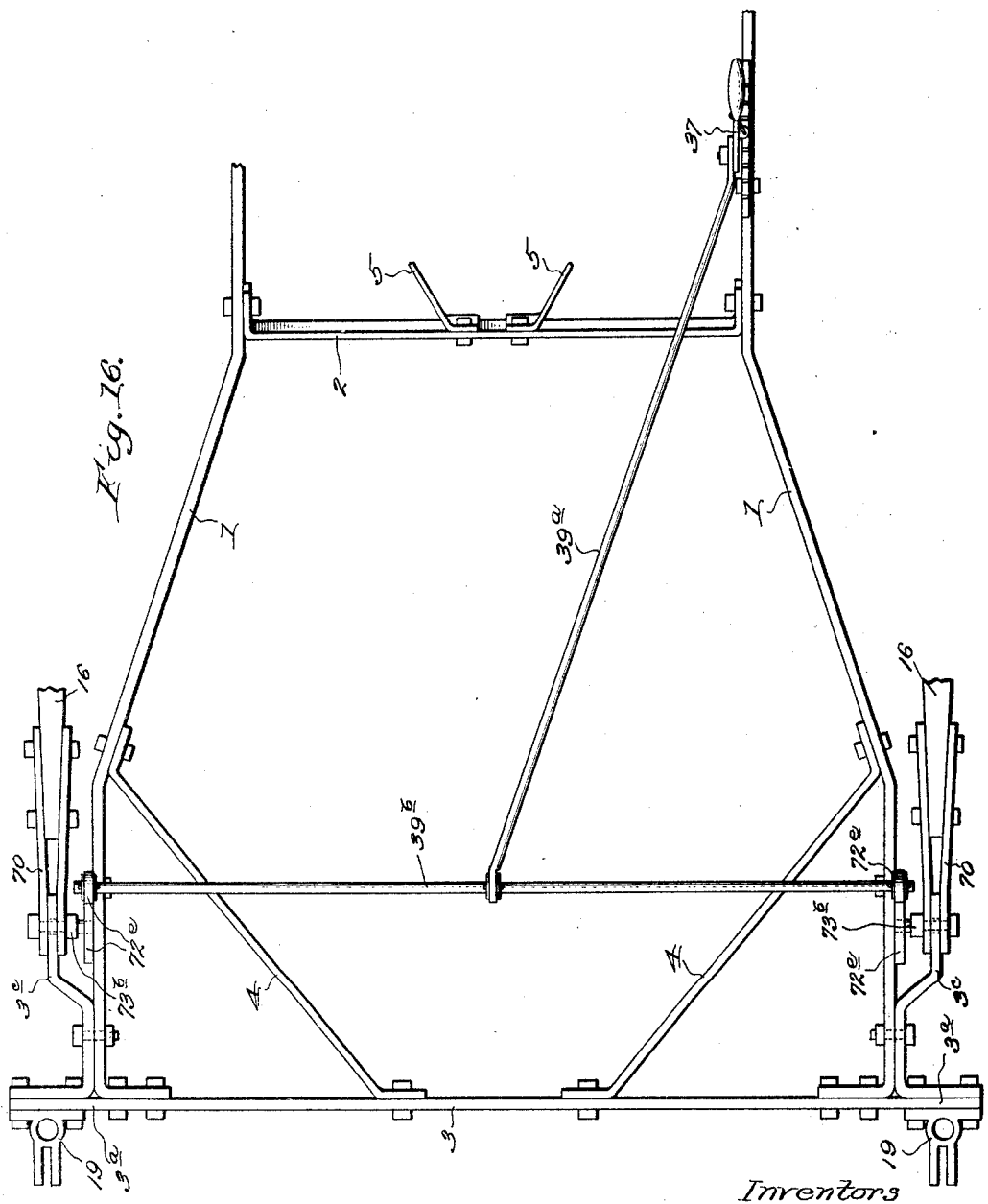

Patented Mar. 31, 1931

1,798,958

UNITED STATES PATENT OFFICE

JAMES A. SMETHERS AND WILLIAM ELLIOTT, OF BEATRICE, NEBRASKA, ASSIGNORS TO DEMPSTER MILL MANUFACTURING COMPANY, OF BEATRICE, NEBRASKA, A CORPORATION OF NEBRASKA

AGRICULTURAL IMPLEMENT

Application filed November 15, 1926. Serial No. 148,542.

This invention relates to improvements in agricultural implements of the planter or so-called lister type; and the objects and nature of the invention will be readily understood by those skilled in the art in the light of the following explanations of the accompanying drawings that illustrate what we now believe to be the preferred mechanical expressions or embodiments of the invention from among other forms, constructions, combinations, and arrangements within the spirit and scope of the invention.

An object of the invention is to provide a planter of the lister type, whether provided with only one plow beam and furrow former or with several such beams and furrow formers to plant but one row or several rows, wherein the beam or beams and hence the furrow former or formers carried thereby, may be tilted to any one of various angles to vary the pitch of the former or formers.

A further object of the invention is to provide a planter of the lister type, whether arranged to plant but one row or several parallel rows, with a stiff or so-called rigid main supporting frame of the wheeled type, wherein the beam or beams and hence the furrow formers carried thereon may be raised and lowered to change the vertical position of the furrow formers independently of the main supporting frame and its carrying wheels, i. e. without vertically shifting the frame or a supporting part thereof or a load thereon and thereby making for ease of operation of said lister.

Another object of the invention is to provide means in multi-row listers of the type described whereby the beams and hence the furrow formers and the packer wheels may be adjusted laterally to change the distance between the rows to be planted to suit the desires of the operator.

A further object of the invention is to provide various improvements in structures, combinations and/or arrangements, with the end in view of producing a highly efficient and advantageous planter of the lister type.

With the foregoing and other objects in view, the invention consists in certain novel features in structure, arrangement, and/or combination as more fully and particularly set forth and specified hereinafter.

Referring to the accompanying drawings forming a part hereof:—

Fig. 1 is a side elevation of a planter of the lister type embodying our invention, certain parts being indicated by dotted lines.

Fig. 2 is a top plan, certain parts being indicated by dotted lines.

Fig. 3 is a rear end elevation.

Fig. 4 is a detail vertical section of one of the furrow formers and covering devices.

Fig. 5 is a detail top plan of the draft connection to a plow beam and the means for elevating and depressing the nose or front end of said beam to vary the angle of the entering point of the furrow former carried by said beam, of Figs. 1 and 2.

Fig. 6 is a detail sectional side elevation of the structure of Fig. 5.

Fig. 7 is a detail horizontal section of the structure of Fig. 5.

Fig. 8 is a detail top plan of a modified plow beam front end draft and adjusting connection.

Fig. 9 is a detail side elevation of the structure of Fig. 8.

Fig. 10 is a detail horizontal section of the structure of Fig. 8.

Figs. 11, 12 and 13, are, respectively, a detail side elevation, a top plan, and a horizontal section of another modified plow beam front end draft and adjusting connection.

Fig. 14 is a detail top plan showing a modified arrangement for vertically adjusting a plow beam nose in a lister of the type disclosed herein, to vary the pitch or vertical angle of the furrow former carried by such beam.

Fig. 15 is a detail side elevation of the modification disclosed by Fig. 14.

Fig. 16 is a detail top plan showing a modified arrangement, whereby the plow beams can be collectively rocked, or rocked together, to vary the pitch or vertical angles of the furrow formers carried by such beams.

The implement shown comprises a non-jointed stiff or so-called rigid main supporting frame that is carried by ground wheels and that carries the operator and the planting attachments, and that transmits the draft to the plow beams hung to or in the frame and carrying and controlling the furrow forming and covering devices.

This so-called rigid main frame comprises the two stiff or rigid longitudinal or opposite side bars 1, at their front ends fixed to and rigidly connected by the front cross bar or end stay 3, with the front of the frame stiffened by the diagonal braces 4 from the side bars 1 to the central portion of the end bar 3; the stiff intermediate cross bar or stay 2, connecting and at its ends fixed to the side bars 1; the diagonal rear braces 5, at their front ends fixed to the central portion of cross bar 2 and diverging rearwardly therefrom and fixed to rear portions of the side bars 1; the main axle 12, arranged under and coupled to the rear ends of the side bars 1, and projecting laterally distances beyond the side bars, with the main supporting and packer wheels 22, mounted on the projecting ends of said axle; the axle brackets 23, fixed to the rear ends of the side bars 1 and coupling the axle thereto; the downwardly diverging legs 8, of the support for seat 24, at their lower ends fixed to brackets 23, and at their upper ends fixed to rear end of center elevated forwardly extending longitudinal member 7, of the seat support, at its front end bolted or otherwise secured to the fixed toothed sector casting or member 30, that at its front end is coupled to the intermediate cross bar 2, by a fixed brace 10; the trailing front corner castor wheels 21, that uphold the front portion of the main frame and embody vertical spindles 20, freely turnable in sockets 19, fixed to the laterally projecting ends of the main frame front cross bar, and equipped with front clevises 19a, for the draft attachments by which the implement is advanced.

The scraper supporting bars 6, are secured to and project rearwardly from the main frame side bars 1, and carry the transverse scraper shaft 25, carrying the scrapers 26 for and located in rear of the supporting and packer wheels 22. Various means can be employed to move the scrapers to and from operative position with respect to the packer wheel treads although we show, for this purpose, foot pedal 28, having link connection 27 with shaft 25, for rocking the same.

The main frame also carries any suitable planter or seed dropping attachments. For instance, we show planter supporting brackets 46a, extending upwardly and outwardly from and secured to the main frame side bars 1, and upholding the seed boxes 46, in advance of the packer wheels 22, respectively. The flexible seed tubes 44, depend from these boxes to drop the seeds in the furrows immediately in advance of the wheels 22. Any suitable seed dropping devices control the delivery of seed from the boxes to the seed tubes, and these devices are operated by the rotary cross shaft 47, actuated by suitable drive mechanism operated by the forward movement of the machine, as by a chain and sprocket drive 48, from one of the supporting and packer wheels 22, and provided with chain guard 49.

The particular example illustrated, happens to show two plow beams with their attached furrow forming and covering devices for planting two rows, but we do not wish to so limit all features of our invention, as our invention broadly contemplates more than two plow beams and their attached devices to plant more than two rows, and also contemplates one plow beam and its attached devices to plant but one row.

In the form shown, two similar plow beams 16 are arranged one on one side of the main frame and the other on the opposite side of said frame, directly in front of the supporting and packer wheels 22, respectively.

These beams 16 receive the draft through suitable pivoted or hinged draft couplings or connections between their front ends and the outer front corner portions of the main frame (in the example shown), preferably in such manner that the beams are in approximate rearward alinement with the lines of draft on the clevis 19a, respectively, although we do not wish to so limit all features of our invention.

Each beam 16 embodies a relatively long straight approximately horizontal length extending rearwardly from its front draft connection, and a downwardly curving rear portion, just in advance of the adjacent wheel 22 that terminates in the downwardly extending and normally forwardly inclined stock or standard 16a, to which is attached the furrow former or plow, also known as the bottom. In the example shown, the furrow forming device or bottom embodies the normally approximately horizontal forwardly projecting point or share 13, and double mold board 14, secured to frog 15 and suitably fastened to the standard 16a, to perform well known furrow forming functions.

The vertical grain boot 43 is arranged centrally behind the furrow former or plow 13—14, and is clamped between plates 43a, extending rearwardly from the depending standard of the plow beam by clamping bolt 43b, whereby the grain boot and parts carried thereby can be adjusted vertically. The flexible seed tube 44 depends loosely into the grain boot, whereby the boot is movable vertically and laterally with relation to the seed tube without interfering with the delivery of grain from tube to boot.

The lower end of boot 43, forms or carries the subsoiler 42, which breaks or opens a small furrow in the floor or bottom of the furrow formed by the plow or bottom 13—14, and the seed from the boot is deposited through the subsoiler into said sub-furrow as will be readily understood by those skilled in the art. The boot and subsoiler are normally held in fixed relation to the beam 16 and the plow or bottom 13—14.

The furrow covering devices are carried by the beam 16, and are arranged behind the plow 13—14, and the boot 43 and the subsoiler carried thereby. Any suitable furrow covering means can be employed, although in the example shown, we employ a pair of inclined rearwardly converging rotary covering disks 45, mounted on and carried by transverse frame or bracket 45a. This covering disk bracket is carried by and pivotally or flexibly hung from the frame or plates 43a and 43c, to permit the bracket 45a, to swing to carry the covering wheels vertically for adjustment purposes or under certain emergency conditions.

The covering disks are yieldingly held to their limit of downward movement by suitable means, such as a tension-spring rod extending downwardly and rearwardly from vertical bracket 52 secured to plates 43c, to the rearwardly projecting central portion of the covering disk frame 45a. The lower end of the rod extends loosely through an eye 45c rigid with frame 45a, and is formed with a stop 57a, to limit downward movement of the eye. A coiled tension spring 57b, surrounds said rod and bears down on said eye to hold the same down to said stop. The upper end of the spring bears against a head 57, on the upper end of said rod. The bracket 52, is formed with a vertical series of bolt holes, and the head 57, is adjustable vertically of and is pivotally coupled to said bracket by a removable cross pin or bolt 52a, adapted to any one of said holes, whereby the rod is coupled to the bracket and can be adjusted vertically thereof to vary the tension of spring 57b, and hence the vertical position of the covering disks. Also, the covering disks can yield vertically against the tension of said springs to permit said disks to ride over an obstruction that otherwise might cause breakage.

These covering disks are so arranged with respect to the furrow former and the main frame and packer wheel 22, that follows the disks, as to cover the furrow and the seeds dropped in the sub-furrow with the required quantity of earth to insure proper growth under normal conditions particularly after the earth has been packed by the packer wheel, in the manner well understood by those skilled in the art, to pack the ground at opposite sides of the furrow to prevent washing while leaving the ground unpacked directly over the covered seeds.

The plow beams 16, are hung from the main frame at their rear portions, and also the desired spacing of the rear portions of said beams is maintained, through the medium of cross shaft or stay bar 11, extending between and arranged under the beams and at its opposite end portions coupled thereto by bearing or fulcrum brackets 17, fixed to and depending from the rear portions of the beams, respectively, and at their lower portions having transverse bearing openings through which shaft 11 extends so that the brackets carry said shaft 11, and can turn or rock thereon, to establish a transverse fulcrum for each beam at the rear portion thereof, i. e. above and preferably slightly in advance of the furrow formers carried by the rear ends of the beams.

This cross shaft or stay 11, is utilized as a part of the support for the beams and the furrow formers carried thereby. For instance, we show an elevated rock shaft 29, extending across the main frame at about the central portion thereof, and provided with forwardly extending lift or crank arms 34, the free ends of which are coupled to the cross stay 11, by depending pivotal push and pull links 35. In the form shown, two sets of arms and links 34—35, are shown, arranged beyond the main frame sides and coupled to the opposite end portions of cross stay 11, and between the beams 16, although we do not wish to so limit the broader features of our invention.

A hand lever 33 rises from and is operatively fixed to rock shaft 29, preferably at the central portion thereof and accessible to the operator occupying seat 24. The rock shaft is arranged beside the fixed toothed sector 30, and is provided with a hand-clip controlled spring-actuated or other suitable ratchet that cooperates with said toothed sector to lock and release the lever. By swinging the lever rearwardly, the beams and furrow forming and other devices carried by the beams, are raised to the desired elevation and will be supported in such position by the ratchet means or other lever lock. By pushing the lever forwardly, the beams and devices carried thereby are depressed to the desired working or other level and are held at such desired level by the lever lock.

The furrow formers and the covering devices can be thus raised and lowered independently of the main frame and of the load carried by that frame and without disturbing the relation between main frame parts and the supporting wheels and without elevating or depressing the driver's seat or other main frame supporting parts. Minimum muscular effort is thus required to elevate and depress the beams and parts carried thereby, and an exceedingly simple and easily understood operation is involved, and in this connection, attention is directed to the hereinafter described foot lever 32.

During these elevating and depressing operations, the plow beams are, in effect, bodily moved vertically, swinging on the alined front cross pins or couplings through which the draft is applied to said beams through the front end extensions or noses thereof.

While we happen to show a plurality or several plow beams that are connected at their rear end portions and supported and movable vertically in unison or as one, yet we do not wish to so limit all features of our invention as it is within our invention to provide but one beam and its set of furrow forming and covering devices, or where several beams are employed, to independently support and move said beams vertically from their rear portions.

In addition to the means whereby the beam or beams is or are supported and moved vertically from their rear portions, we provide means whereby the beam (or each beam independently where several beams are provided) can be rocked vertically on a transverse axis or fulcrum located at or near the rear end portion of the beam to quickly or abruptly change the pitch or soil entering angle of the furrow former or the entering point thereof, without disconnecting or rendering inoperative the draft connection between the nose of the beam and the main frame. The purpose of this adjustment is to permit quick and easy change in the angular position of the furrow former, to cause the same to enter the ground quickly to quickly initiate the furrow forming operation, and thereby reduce to the minimum unplanted or unlisted spaces at the ends of the field or rows. After the sharp angle or abruptly adjusted furrow former has reached the desired depth in the ground, the beam is rocked to bring the furrow former to the proper angle for general operation. This abrupt or quick angular adjustment is also desirable to take care of different ground structures or formations, and also to compensate for plow or furrow former wear, particularly in a several row planter where one furrow former wears more rapidly than the other or others.

In the particular example shown, the cross or stay shaft 11, is utilized to form the elevated cross fulcrum at the rear end portions of the beams 16, on which said beams are independently rockable to attain the desired quick angular adjustment, while each beam is provided with its own means applied to its front end or nose for rocking the beam and locking the same in the desired angular position to attain said quick rocking adjustment without operatively disturbing the attachment of the draft to the beam.

Upright hand levers 37, one for each beam 16, are mounted on the main frame accessible to the operator from the seat 24. These levers are mounted on and carried by fixed brackets 38a, fixed to and rising from the frame side bars 1, respectively, and in which the rock shaft 29, is also mounted. These brackets provide fixed toothed sectors 38, one for each hand lever 37, to cooperate with hand controlled ratchet devices for locking and releasing the levers, respectively.

A suitable operating connection, such as a push and pull and lever connection extends from each hand lever 37 to the front end or nose of its beam 16 to lift or depress said nose, according to the direction in which the lever is swung, and thereby rock the beam on its rear elevated fulcrum 11.

In what we now believe to be the preferred construction, for each beam 16, a push and pull link 39, is pivotally connected to its hand lever 37, and extends forwardly therefrom and at its front end is pivotally coupled to the upper end of the upstanding arm of a vertically swingable elbow or bell crank lever 72, fulcrumed on the transverse draft pin 73, through which the plow beam 16, receives its draft from the main frame. The forwardly extending approximately horizontal arm of the elbow lever 72, has pivotal lifting and depressing connection with the front extremity of the beam nose or extension 70, through the medium of cross pin or pivot 77. By this arrangement, forward swing of hand lever 37, will rock elbow lever 72, to depress the nose of the plow beam and rock the beam to quickly elevate the rear end thereof and the furrow former to a sharp quick penetrating angle. Opposite swing of said hand lever will cause opposite quick angular movement of the furrow former.

The front end of the elbow lever 72, is longitudinally slotted to receive the pivot 77. In this instance, the elbow lever is fulcrumed on the draft pin 73, which is stationary in parts of the main frame, and hence the beam nose or extension 70, is transversely or vertically slotted, at 70a, to permit the relative vertical movement of said nose 70 with respect to the elbow lever and draft pin.

The draft pin 73, extends across the space between the adjacent side bar 1 of the main frame and a rearwardly extending end 71, of the main frame front cross bar 3, and at its ends fits in and extends through holes in said bar 1 and bar end 71 and is confined thereto.

The rigid front extension or nose 70 of the plow beam 16, is formed by a pair of forwardly converging spaced plates bolted to and fitting opposite sides of the beam 16, and projecting forwardly therefrom at opposite side faces of the adjusting lever 72. These plates 70, are formed with the alined vertical slots 70a, through which the fixed draft pin 73, extends and which permit the vertical rocking movement of the beam.

The draft pin 73, is movably secured in the main frame parts 1, 71, and spacing washers 75, and sleeves 74, are removably arranged on said pin between the plates 70 and the adjacent frame parts 1, 71.

In this arrangement, the front cross bar 3, is extended laterally at 3a, beyond the side bars 1, at both front corners of the machine, and the castor wheel brackets that provide sockets 19 and draft clevises 19a, are fixed to the front sides of said extended ends 3a, so that the draft pins 73, are located directly behind said brackets and draft attachments 19a, and in direct line of draft therefrom.

The outer extremities of the bars 3, from the outer ends of extensions 3a, are bent back to parallelism with frame side bars 1, to form the outer sides 71, of the front outer corner frame draft connections to the draft pins 73, which outer corner or projecting frame portions can be strengthened by diagonal braces 76.

In the modified arrangement disclosed by Figs. 8, 9, and 10 of the drawings, draft bars 3b are fixed to the rear sides of the outer end extensions of the main frame front cross bar 3, and are then back at right angles to extend rearwardly along the outer sides of the frame bars 1, to which they are secured. At the outer corners of the main frame and just in advance of the plow beam nose or extensions, the rearwardly extending rear ends 3c, of said bars 3b, are offset outwardly from frame bars 1, and each is formed with a vertically elongated slot 3d, to receive the plow beam draft pin 73a, carried by the front ends of the plow beam nose or extension plates 70b, that straddle said draft bar end 3c, and are vertically slidable thereon as the plow beam is rocked on its fulcrum 11. In this form, the push and pull connections 39, are coupled to the upright arms of vertically swingable elbow levers 72a, fulcrumed on brackets 72b, and having their forwardly extending arms coupled to the plow beam noses 70b, by push and pull links 72c located in rear of the draft pins 73a. The operation of this modification will be obvious from the illustration and preceding descriptions.

In the modification shown by Figs. 11, 12 and 13, the main frame formation and draft bars 3b—3c—3d, are the same as described in connection with Figs. 8, 9 and 10, and the plow beam extension or nose plates 70b, extend forwardly at opposite faces of the draft bar ends 3c, and carry the draft pins 73b, that extend transversely through the vertical slots 3d. However, in this modification, the draft bolts 73b, are extended inwardly to form trunnions 73c, entering longitudinal slots 72d, in the forwardly extending arms of vertically-swingable elbow levers 72e, arranged at the outer sides of main frame bars 1, to which said levers are fulcrumed, at 72g, with the push and pull links 39, coupled to the upper ends of the upstanding arms of levers 72e.

From preceding descriptions, it will be obvious that each plow beam will be rocked on its fulcrum 11, by rocking the lever 72e, to elevate and depress the draft pin 73b, in the vertical slot 3d, in the frame draft bar end 3c.

Provision is made for independent lateral adjustment of each plow beam and the devices carried thereby, with respect to the main frame, to vary the spacing between the furrows or rows, where the implement has several plow beams and devices carried thereby. For instance, referring to Figs. 2, 5, 6, and 7, the draft pin 73, is removable from frame draft bars 1, 71, and from the washers 75, and spacing sleeves 74, as well as from the plow beam extension plates 70, and lever 72. When these parts are separated, the plow beam extension can be moved on the draft pin 73 longitudinally thereof toward either the frame bar 1, or toward the frame bar 71, and the spacing sleeves 74, can be correspondingly shifted or rearranged on the draft pin, both between frame bar 1, and the adjacent washer 75, or both between the other washer 75 and the frame bar 71. The rear portion of each beam 16, can be correspondingly shifted laterally to line up the beam with its front lateral adjustment, as the bearing brackets or hangers 17, that receive the cross shaft or stay 11, are adjustable on said shaft 11, longitudinally thereof.

The main supporting and packer wheels 22, are also longitudinally adjustable independently of each other, on their common axle 12, by adjusting the sand bands 53, on the axle 12, to line up said wheels with the respective furrow forming and covering devices.

Provision is also made for correspondingly adjusting the scrapers 26, along the scraper shaft 25.

The main lever 33, that controls the vertical positions of the plow beams and consequently of the furrow former and covering devices, is shown provided with an auxiliary foot lever 32, rigid therewith and extending rearwardly thereon and accessible to the occupant of seat 24, so that the operator can employ both leg and arm in vertically moving the plow beams and devices carried thereby.

Lever 33, controls the vertical position of and supports the plow beam and devices carried thereby, and moves the same vertically without disturbing the main frame and the relative positions of its ground or supporting wheels. Where the implement is provided with several plow beams to plant several rows, the several beams are moved vertically in unison by the supporting means that here embodies the lever 33.

The plow beam, or each plow beam where there are several, is rockable through the medium of its own independent lever 37, independently of the main frame and of the plow beam support 11, and of the other plow beam or beams, to quickly and abruptly change the pitch or vertical angle of the furrow former relative to the main frame, to cause quick starting of the furrow forming operation.

The implement thus provides a quickly changeable adjustment by which the angle of the beam and hence the angle of the bottom or furrow forming device may be changed relative to the rigid frame and hence to ground on which the machine operates. By changing this angle, the pitch or suction of the bottom may be quickly and easily regulated to suit the operator of the machine. This enables the operator to enter the bottoms quickly at the beginning of a row and prevent the loss of considerable space at the end of the field, where otherwise, the furrow would not be properly formed and the seeds properly planted. By means of this quickly made adjustment, it is also possible to change the pitch of the bottom relative to the frame so that the lister will operate most efficiently in any certain structure or ground formation. When used on machines which list two or more rows at a time, the angle of each bottom may be regulated independently of the other bottoms, so that each furrow forming device will operate most efficiently, regardless of whether or not they are adjusted exactly identical, or whether the continued use has caused one device to become duller or more worn than the other, and this implement also provides a wheeled machine of a rigid frame type so that the bottom or furrow forming device may be raised from and lowered toward the ground without raising and lowering the frame. In many machines the operator, in raising or lowering the bottom, raises and lowers his own weight, which extra labor is eliminated in the implement of our invention.

Each plow beam can, also, be rocked vertically on its fulcrum 11, to vary the pitch or vertical angle of its furrow former, and to secure the same in the desired adjustment, without the interposition of a hand lever or levers and operating connections therefrom to the nose of the plow beam or beams. For instance, in Figs. 14 and 15, we show the draft from the main frame of the machine transmitted to the nose 70, of the plow beam 16, through the medium of a detachable or removable transverse draft pin 75, which is, by hand, vertically adjustable with respect to the frame to vertically tilt the plow beam and hold the same at the desired angular position. The front ends 3a, of the main frame that project laterally beyond the main frame longitudinal bars 1, have rearwardly extending spaced draft bars 71b, rigidly secured thereto. The removable or detachable draft pin 75, of each plow beam extends transversely through an eye in the front end of the plow beam nose 70, (located between the rear portions of the draft bars 71b) and through alined perforations 71d, in the vertically enlarged ends 71c of said bars 71b. Each end 71c is formed with a vertical series of spaced transverse draft pin holes 71d, each hole 71d of one end 71c, being alined with a corresponding hole 71d, in the other bar end of the pair, so that the draft pin can be slipped from one set of holes and the plow beam nose and reinserted in another set of holes, relatively depressed or elevated, to depress or elevate the plow beam nose, and thus change the angular position or pitch of the furrow former carried by such beam. The draft pin can be removably or detachably secured against accidental detachment from the bar ends 71c, and the plow beam nose by any suitable means.

In the particular form shown, removable spacing sleeves are arranged on the draft pin 75 between the plow beam nose and the adjacent bar ends 71c, to permit replacement with sleeves of different lengths where the plow beam is to be shifted laterally.

It is also possible to provide lever operated means for simultaneously and collectively tilting several plow beams to change the pitch or angular positions of the furrow formers carried thereby. For instance, in Fig. 16, we show but one hand lever 37, (the other lever 37 being eliminated), pivotally connected by pull rod 39a, to a cross rod 39b, connecting the upstanding arms of the elbow levers 72e, whereby swing of the one hand lever 37, will simultaneously rock the several elbow levers 72e, to simultaneously raise or lower the several plow noses to tilt the several plow beams and hold them in the desired titlted adjustment. It so happens, that we show this single control for several plow beams, applied to the structure illustrated by Figs. 11, 12 and 13, although it could also be applied to the structure shown by Figs. 1 and 5 to 10.

Tractors, and also manually-controlled power lifts, are in common use in connection with various agricultural implements, the power lifts being often employed instead of manually-actuated hand levers for heavy work, and hence we do not wish to limit all features of our invention to the use of manually-operated hand levers particularly such as hand lever 33, for raising and lowering the plow beams and plows.

It is obvious that various changes, omissions, additions, and variations might be resorted to without departing from the spirit and scope of our invention, and hence we do not wish to limit our invention to the approximate exact disclosures hereof.

What we claim is:—

1. An agricultural implement comprising a main frame provided with supporting wheels, several elongated rearwardly extending plow beams, each at its rear end portion provided with and carrying furrow forming devices; draft means coupling the noses of said beams to the main frame, respectively; plow beam supporting means between the main frame and the rear portions of said beams for bodily elevating said beams in unison relative to the main frame and for controlling the vertical positions of said beams and the devices carried thereby with respect to the main frame; and adjusting means for independently rocking each beam to abruptly vary the vertical angle of the furrow forming devices carried thereby with respect to the main frame.

2. An agricultural implement comprising a rigid or non-jointed main frame having supporting wheels; plow beams each at its front end having hinge-forming draft connection with the frame, each beam at its rear portion provided with and carrying furrow forming means; plow beam lifting means whereby said beams are hung from said frame and the vertical positions of said beams are controlled, said lifting means being constructed and arranged to swing said beams vertically from said front draft connections with respect to said frame; and manually controlled means for rocking either beam to change the pitch or vertical angle of its furrow forming means.

3. An agricultural implement comprising a main frame having front draft bars, plow beams having front noses and draft pins whereby said noses are coupled to said bars to receive the draft therefrom, said couplings providing for relative movement of each beam nose with respect to the frame; furrow forming devices carried by the rear end portions of said beams; and manually controlled means carried by the frame and coupled to the rear portions of said beams for supporting and hanging said beams from said frame and for controlling the vertical positions thereof; each beam having manually controlled means for elevating and depressing its nose to vary the pitch or vertical angle of the furrow forming device carried by the beam.

4. An agricultural implement comprising a main frame having front draft bars, plow beams having front noses, furrow forming devices carried by the rear end portions of said beams, and manually controlled means carried by the frame and coupled to the rear portions of said beams for supporting and hanging said beams from the frame and for controlling the vertical positions thereof, each beam having manually controlled means for elevating and depressing its nose to vary the pitch or vertical angle of the furrow forming device carried by the beam.

5. An agricultural implement comprising a wheeled supporting frame of the rigid, non-jointed type including main supporting wheels, plow beams at their forward ends coupled to said frame to receive the draft therefrom, said beams provided at their rear ends with and carrying furrow forming devices, separate manually controlled means for each beam extending from said frame and embodying lifting and depressing levers applied to the forward ends of the beams to elevate and depress the same with respect to the frame to vary the pitch or vertical angle of the furrow forming devices, and means providing fulcrums for said beams and by which the beams are hung from the frame.

6. An agricultural implement of the type described, having a main frame of rigid, non-jointed construction supported by ground packing wheels at the rear and castor wheels at the front, a plurality of beams carried by the frame and attached thereto at their forward ends and being provided with and carrying furrow forming devices at their rear ends, manually controlled mechanism carried by the frame and attached to the beams at the rear for vertically moving the beams to move the furrow forming devices to and from their operative position, and manually controlled mechanism carried by the frame and operatively attached to the forward ends of said beams for selectively moving the beams to adjust the pitch of the furrow forming devices, respectively, while they are in either their operative or inoperative positions.

7. In a lister; in combination; a rigid main frame; supporting wheels upholding the front and rear of said frame; plows provided with plow beams receiving their draft at their front ends from said main frame; draft transmitting couplings between the main frame and the front ends of said plow beams, said couplings providing means whereby the front ends of said beams can be independently elevated and depressed and thus held with respect to the main frame to separately tilt or level the plows, said couplings providing hinge connections on which said beams are swingable vertically with respect to the main frame, to carry the plows to and between transporting and operative positions; and means for thus swinging said beams and holding the same in transporting and operative positions; said last mentioned means providing a support on which said beams independently rock when selectively elevated or depressed at their front ends to tilt either plow.

8. In combination, in a lister; a rigid main frame having supporting wheels upholding its front and rear; plow beams carrying lister plows, said beams having brackets at their rear portions providing bearings; a cross shaft between and spacing said beams, said brackets mounted on said shaft, whereby said beams are independently rockable on said cross shaft as an axis with respect to the main frame to selectively level the plows or change their plow point angles, and whereby said beams are swingable vertically as a unit from their front ends with respect to the main frame to carry the plows to and from operative and transporting positions; mechanism and its locking means including push and pull operative connection with said plow beams to thus swing and lock the same as a unit; draft couplings from the main frame to the front ends of said plow beams through which the draft is applied to said beams, said couplings providing for independent vertical adjustment of the front ends of said beams with respect to said frame; independent levers and their locking means being provided for said beams, respectively, to selectively and independently elevate or depress the beam front ends and thus lock the same to attain said plow levelling or change of plow point angle.

9. In a lister, in combination; a rigid main frame; front and rear wheeled supports for said frame; a lister plow assembly including lister plows and their plow beams; draft transmitting couplings from the main frame front to the front ends of said plow beams on which said beams are swingable vertically as a unit with respect to the main frame to carry the plows to and from transporting and operative positions; actuating and locking means for thus swinging said beams as a unit and for holding them in said positions; said beams being independently selectively rockable on an intermediate axis and with respect to the main frame to level or change the point angles of their respective plows; manually controlled and locking means being provided for each beam whereby the draft receiving front ends of said beams can be independently elevated or depressed with respect to said main frame front and thus locked to level or change the point angle of its plow.

10. In a lister, in combination; a rigid main frame adapted to be advanced by the draft applied to the front thereof; supporting wheels for and upholding the front and rear of said frame; a plow assembly including a lister plow and its plow beam; a draft transmitting coupling from the frame front to the front end of said plow beam, said coupling providing a hinge connection on which said plow beam is swingable vertically with respect to said main frame to carry the plow to and between transporting and operative positions, said coupling providing means whereby the front end of said beam can be set and held at various elevations with respect to the frame to rock the beam on an intermediate axis and control the angle of the plow point; and means between the main frame and said assembly, whereby said assembly is swung vertically to and between and maintained in transporting and operative positions.

11. In a lister; in combination; a rigid main frame; supporting wheels upholding said frame at its front and rear; a lister plow assembly including a plow and its plow beam, said frame front provided with a draft pin for said beam; the front end of the beam having a vertically disposed slot receiving said draft pin; a lever fulcrumed on said pin and operatively coupled to said beam to elevate and depress the front end of said beam and control the elevation thereof with respect to said frame; manually controlled means for actuating and locking said lever; and manually controlled means for raising and lowering said assembly to and from and locking the same in transporting and operating positions, said plow beam being rockable on an intermediate axis when its front end is elevated or depressed to control the plow point angle.

12. In a lister, in combination; a rigid main frame having supporting wheels, the frame front provided with rigid draft portions, draft pins carried by said portions and separately vertically adjustable with respect thereto; plow beams provided with lister plows and receiving their draft from said pins, respectively; each plow beam being independently rockable on an intermediate axis to level its plow or change the point angle thereof when its draft pin is adjusted vertically with respect to said frame; means whereby said draft pins, respectively, are maintained at the vertical positions to which adjusted with respect to the frame; said plow beams being swingable vertically as a unit on said draft pins to and from plow transporting and operative positions; and a lever, and its locking means, applied to said beams to thus swing the same vertically and lock the same in transporting and operative positions.

13. In a lister, in combination; a rigid main frame having supporting wheels upholding its front and rear; plow beams carrying lister plows; a cross shaft joining said beams and on which they are independently rockable on an axis intermediate their lengths; draft transmitting couplings between the main frame front and the plow beam front ends and through which said beams receive their draft means for independently raising and lowering the front ends of said beams, respectively, with respect to the main frame to independently rock said beams on said shaft to level the plows or the plow point angles and for holding the beams in such relative adjustments; and a lever having locking means, said lever having push and pull connection with said shaft to vertically swing said beams as a unit from said couplings and with respect to the frame to raise and lower the plows.

Signed at Beatrice, Nebraska, this 1st day of November, 1926.

JAMES A. SMETHERS.
WILLIAM ELLIOTT.